US007927287B2

(12) United States Patent
Anderson et al.

(10) Patent No.: US 7,927,287 B2
(45) Date of Patent: Apr. 19, 2011

(54) HERD MANAGEMENT TECHNOLOGY

(75) Inventors: Mark L. Anderson, Spring Valley, WI (US); T. Boyd Dingus, Lakeville, MN (US)

(73) Assignee: Mark Anderson, Spring Valley, WI (US)

( * ) Notice: Subject to any disclaimer, the term of this patent is extended or adjusted under 35 U.S.C. 154(b) by 629 days.

(21) Appl. No.: 11/879,064

(22) Filed: Jul. 16, 2007

(65) Prior Publication Data

US 2008/0110406 A1    May 15, 2008

Related U.S. Application Data

(60) Provisional application No. 60/857,969, filed on Nov. 9, 2006.

(51) Int. Cl.
*A61B 10/00* (2006.01)
*A61B 5/103* (2006.01)
*A61B 5/117* (2006.01)

(52) U.S. Cl. ......... 600/551; 600/587; 600/588; 600/595

(58) Field of Classification Search .................. 600/300, 600/304, 306, 382, 386, 391, 392, 551, 587, 600/588, 591, 595; 119/14.01, 416, 436
See application file for complete search history.

(56) References Cited

U.S. PATENT DOCUMENTS

| | | | |
|---|---|---|---|
| 3,076,431 A | 2/1963 | Rule | |
| 4,895,165 A | 1/1990 | Blair | |
| 5,542,431 A | 8/1996 | Starzl et al. | |
| 5,566,679 A | 10/1996 | Herriott | |
| 5,839,390 A | 11/1998 | Meads | |
| 5,881,673 A | 3/1999 | Beach et al. | |
| 6,342,041 B1 | 1/2002 | Saint-Ramon et al. | |
| 6,467,430 B1 | 10/2002 | Stampe | |
| 6,708,648 B2 | 3/2004 | Stampe | |

FOREIGN PATENT DOCUMENTS

| | | |
|---|---|---|
| GB | 2139117 A | 11/1984 |
| NZ | 221965 | 6/1996 |
| NZ | 501444 | 4/2002 |
| WO | WO 00/36907 | 6/2000 |
| WO | WO 2004/000158 A | 12/2003 |

OTHER PUBLICATIONS

Estrus Alert Brochure Copyright 2003.
The Green to Gold publication produced by Livestock Improvement Corporation Limited, vol. 1 No. 2, published on Nov. 21, 2001.
Animal production 48:000 British Society of Animal Production proceedings of Winter Meeting 1989, Evaluation of a marking web device as an aid to estrus detection in cattle.
Theriogenology—an International Journal of Animal Reproduction, Dec. 1988, vol. 30, No. 6, pp. 1099-1114.

*Primary Examiner* — Jeffrey G Hoekstra
(74) *Attorney, Agent, or Firm* — Skinner and Associates

(57) ABSTRACT

A method of determining breeding status in animals by (a) determining a breeding event (cyclicity, mounting, pregnancy, open) time, (b) providing an estrus or other breeding event detection apparatus, (c) affixing the estrus detection apparatus at a predetermined location on a female animal at a predetermined application time prior to the breeding event time, and (d) monitoring the estrus detection apparatus for activation thereof. An indicator apparatus is provided for use in indicating when an animal is in estrus. The apparatus is configured to be affixed to the rump of an animal to detect and indicate when the animal has been mounted and, thus, when the animal is in estrus. The apparatus is affixed to the animal by an adhesive layer. Layered on the top surface of the adhesive layer is an indicator layer that is in turn covered with a floodcoat layer. The floodcoat layer is adapted for removal upon the mounting of the first animal by a second animal. Removal of the floodcoat layer exposes the indicator layer indicating that the first animal has been mounted, thereby indicating that the first animal is in heat. The floodcoat layer is highly visible and may be seen from a distance.

7 Claims, 7 Drawing Sheets

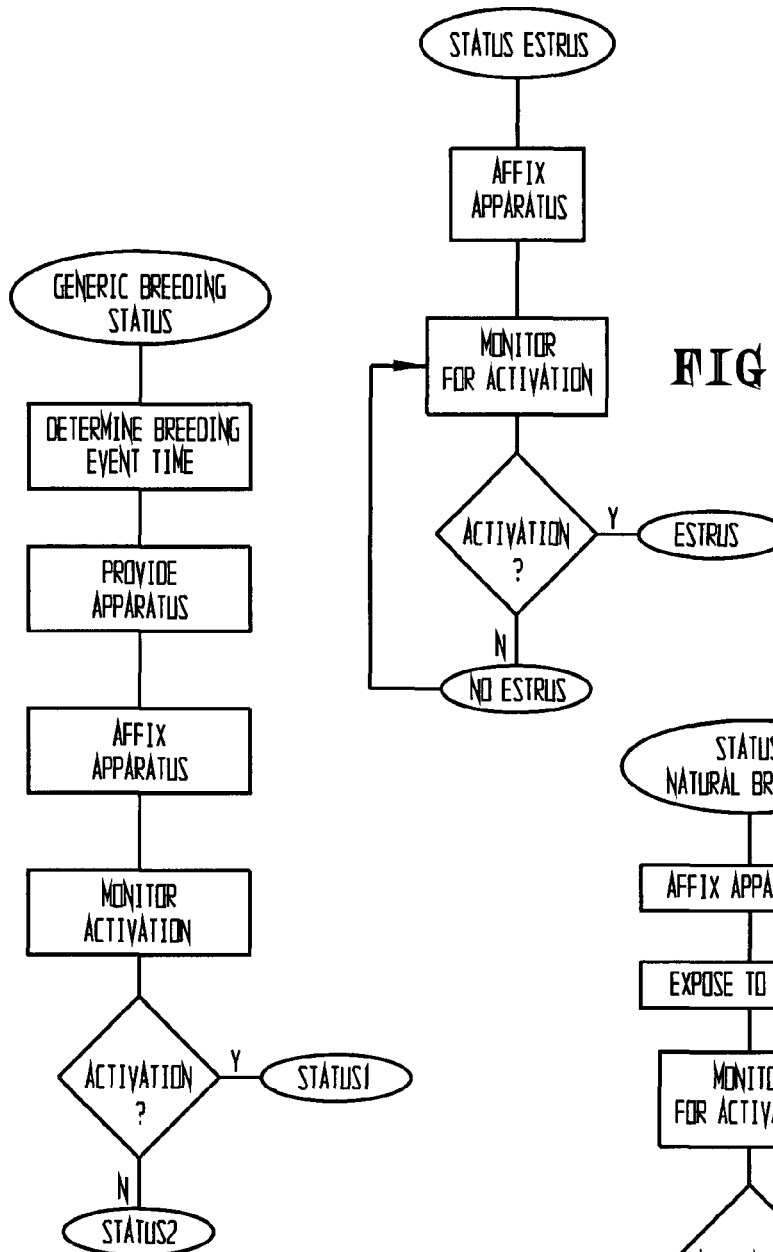
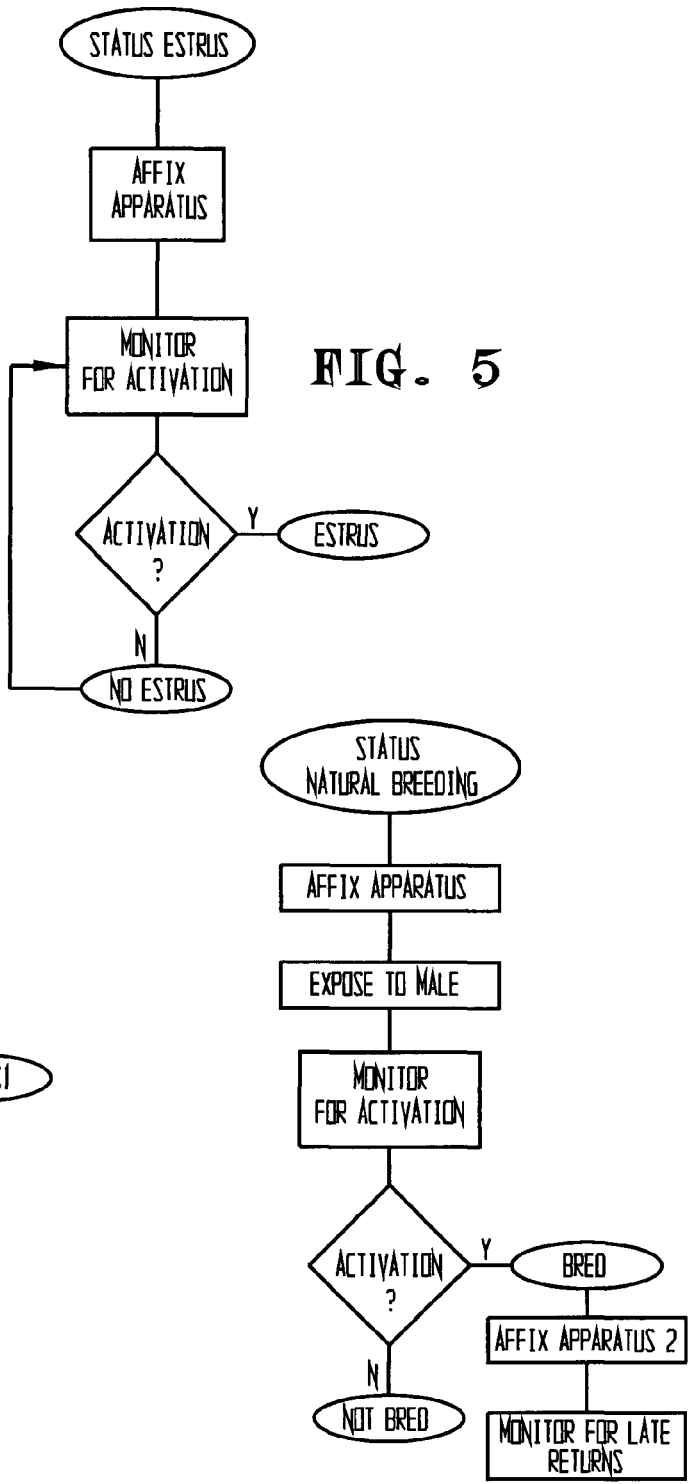
FIG. 4
FIG. 5
FIG. 6

HERD MANAGEMENT TECHNOLOGY

CROSS-REFERENCE TO RELATED APPLICATIONS, IF ANY

This application is a continuation of U.S. Provisional Application No. 60/857,969; filed Nov. 09, 2006, status expired.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND

1. Field

The present invention relates, generally, to animal reproduction apparatus, systems and methods. More particularly, the invention relates to ruminant animal reproduction apparatus, systems and methods. Most particularly, the invention relates to a system and method for beef and dairy cow herd reproduction management. The apparatus and methods of use provide a means of managing breeding and diagnosis of the health of an animal or of a herd of animals via visual means. They also provide a historical management, record keeping and memory means.

2. Background Information

It is typically desirable in the field of animal husbandry to selectively breed livestock. This may be done by mating selected animals, artificially inseminating an animal, or any other suitable method. However, any method used entails determining when the animal is in heat in order for insemination to fertilize the animal. The heat cycle is of a short duration and insemination must occur during the cycle. The accurate detection of estrus is a problem long recognized in the prior art.

Typically, when an animal, for example, a cow, is not in heat, she will not allow herself to be mounted. Conversely, when a cow is in heat, the cow will show an increased tendency to stand and permit itself to be mounted by other animals for an appreciable time. When the mounted animal allows the mounting animal to remain for about five seconds, a "standing mount" has occurred and the cow is classified as in standing heat. This condition occurs in the early stages of estrus. The most frequent mountings occur by bulls, but mountings are also made by other cows. Accordingly, the repeated mounting of a cow or heifer by any other such animal is a good indication that the cow is in heat.

The identification of cows in heat has traditionally been accomplished by observation, the cows seen to allow mounting by other cows being separated from the herd. While visual inspection and observation of a herd may be employed to identify and segregate females in heat, because the heat cycle is of short duration, such visual observation must be conducted multiple times and accompanied by immediate segregation or marking of the animals to be inseminated. Visual observation of the herd, which is often widely dispersed, is typically inefficient. Further, if no indicating device is used, unless the herd is maintained under constant visual observation, the heat cycle may go undetected in many animals.

A variety of prior art devices have been developed for indicating when an animal is in heat by showing when the animal has been mounted. Automatic indicators have been used that are attached to the top rear section of the animal between the hip-bones and hip bones along the spine and are set off by other animals mounting the animal in heat. Typically, the indicators rely on the pressure exerted by the chest or brisket of the mounting animal. A common indicator of this type includes a passive apparatus including a reservoir of marker fluid which is compressed by the mounting pressure to discharge some or all fluid and thereby mark the mounted animal. Frequently, these devices suffer from incidental seepage of the marker fluid. This can result in an undesirably short shelf-life of the product. Further, the prior art devices involve complicated dye packet devices that are undesirably complex and expensive.

For these and other reasons, a need exists for the present invention.

BRIEF SUMMARY

The present invention provides an improved system and method for beef and dairy cow herd reproduction management which is practical, reliable, accurate and efficient, and which is believed to fulfill a need and to constitute an improvement over the background technology.

In one aspect, the invention provides a method of determining breeding status in animals by (a) determining a breeding event (cyclicity, mounting, pregnancy, openess or the like), (b) providing a breeding event or status detection apparatus, (c) affixing the breeding event or status detection apparatus at a predetermined location on a female animal at a predetermined application time prior to the breeding event, and (d) monitoring the breeding event or status detection apparatus for activation thereof.

The aspects, features, advantages, benefits and objects of the invention will become clear to those skilled in the art by reference to the following description, claims and drawings.

BRIEF DESCRIPTION OF THE SEVERAL VIEWS OF THE DRAWING

The present invention, and the manner and process of making and using it, will be better understood by those skilled in the art by reference to the following drawings.

FIG. 4 is a flow diagram of an embodiment of the method of determining at least one breeding status of the invention.

FIG. 5 is a flow diagram of an embodiment of the method wherein the breeding status is estrus.

FIG. 6 is a flow diagram of an embodiment of the method wherein the breeding status is natural service breeding.

DETAILED DESCRIPTION

Figure 1:
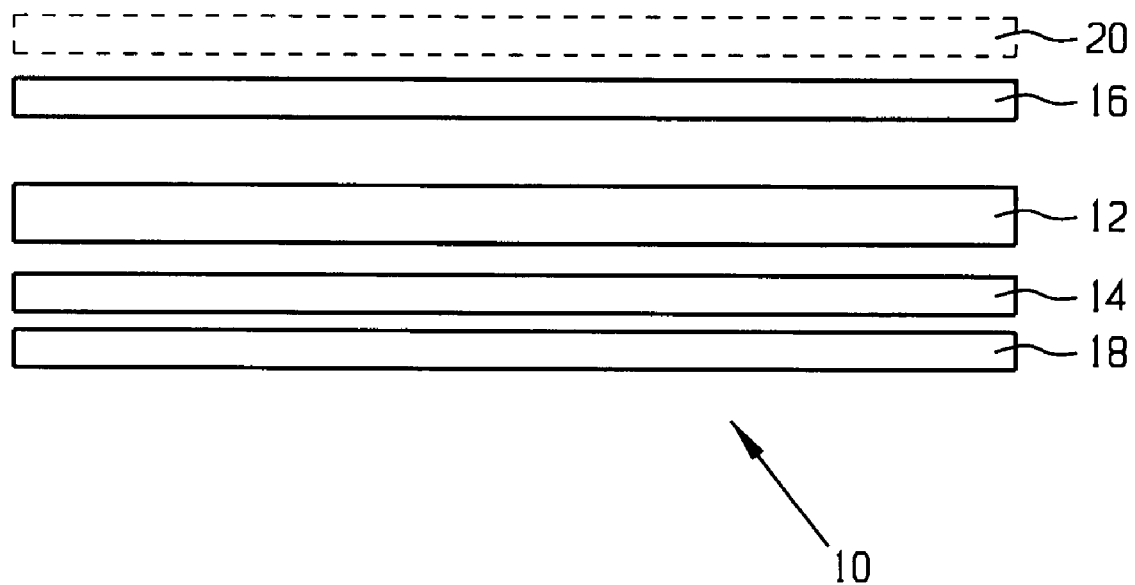
FIG. 1 is an exploded side view of a first embodiment of the invention.

The present invention provides a simple and durable indicator system and method for detecting and indicating when a first animal is in heat or has been bred by natural service. Although throughout this application, dairy and beef cattle are used as an example, it is to be understood that the present invention may be easily adapted to be used to detect heat in other animals such as sheep, goats, llamas, alpaca, camels, deer, oxen, water buffalo and other ruminants or cloven hooved animals.

Dairy cattle are specialized animals, focused primarily on producing milk. Dairy cattle may be found in herds on farms where dairy farmers own, manage, care for, and collect milk from them. These herds range in size from small boutiques of fewer than five cows to large conglomerates of 25,000 cows or more. The average dairy farmer in the U.S. owns about one hundred cows.

A young dairy animal is known as a calf. A female calf which has not given birth to a calf (also called calving or parturition) and is less than thirty months old is called a heifer. After calving, or when more than thirty months old, a female dairy animal is known as a cow. An uncastrated, male dairy animal is called a bull at any stage of life. Cows are unique in their ability to produce milk, and thus heifers, young cows, are generally considered more valuable than bulls, which once castrated, are used solely for beef production, while bulls of superior genetics are used for breeding purposes.

The production of milk requires that the cow be in lactation, which is a result of the cow having given birth to a calf. Calves are separated from their mothers (dams) within a few hours of birth so as to produce milk for human consumption as soon as possible. The cycle of insemination, pregnancy, birthing of calves, and lactation, followed by a "dry" period before insemination can recur, requires a period of 12 to 16 months for each cow. Dairy operations therefore typically include both the production of milk and the production of calves, for replacement or the use of calves for veal.

As a cow cannot produce milk until after calving, most farmers will attempt to breed heifers as soon as they are fit, at about fifteen months of age. A cow's gestation period is about nine months (279 days long), so most heifers give birth and become cows at about two years of age. About 70 days after calving, a cow's milk production will peak. Heat detection is initiated after the approximately 70 day voluntary waiting period (VWP). Then the cow is rebred as quickly as possible. The cow's production slowly dwindles until, at about 305 days after calving, the cow is 'dried', or when the farmer stops milking her. Ideally, about sixty days later, one year after her previous calf was born, a cow will give birth again. Research data indicates that as dairy herds have gotten larger, reproduction has become more difficult. The days open before rebreeding after calving has increased substantially, which has significantly increased dairy calving intervals to unacceptable levels. Some researchers attribute this to poor heat detection as the dairyman is managing more cows with less labor per animal.

Recent additions to dairy and beef management include embryo transfer, artificial insemination, and estrus synchronization. Embryo transfer attempts to ensure that high quality cows' progeny is more widespread than what is naturally possible. Some cows are 'flushed', where multiple, for example 7-12, embryos are removed from their reproductive systems. These embryos are then transferred into other cows who serve as surrogate mothers. Artificial insemination (AI) of farm animals is very common in today's agriculture industry, especially for breeding dairy cattle (75% of all inseminations). AI provides an economical means for a livestock grower to breed their herds with males having very desirable traits. Synchronization programs allow dairy producers to attempt to control the rate of pregnancy production through 100% submission to 1st insemination by a designated time frame and aggressive re-enrollment of animals found open (not pregnant) at pregnancy check. Protocols involve CIDR®, prostaglandins, gonadatropin releasing hormones, and various othe hormone regimens.

1. Apparatus

FIG. 1 depicts an exploded side view of a first embodiment of the invention. Most simply, the apparatus is provided as a patch for adhesion to a first animal, the patch being configured for a visual change upon mounting of the first animal by a second animal. Typically, mounting of a first animal by a second animal is an indication that the first animal is in heat. The patch is designed for application to the rump of a first animal, perpendicular to the spine halfway between the pin (tail) bones 41 and hook (hip) bones 40.

An example embodiment of an estrus/breeding indicator used in the process of this invention is made up of a plurality of layers. The indicator layer 12 is diagrammatically in the middle of the indicator 10. The indicator layer 12 has an adhesive 14 on its bottom side for attachment to the first animal. A scratchcoat or floodcoat 16 is positioned on the top side of the indicator layer 12 to obscure the indicator layer 12 until the floodcoat 16 is removed. Prior to deployment of the indicator 10 on the first animal, a liner 18 is provided along the adhesive 14 and the floodcoat 16.

The indicator layer 12 is designed with highly visible fluorescent colors such that it may be viewed from some distance and does not camouflage on any naturally-occurring color of animal. Optionally, the indicator layer 12 may be a reflective or prismatic foil. An example reflective foil is manufactured by Spectratek (of Los Angeles, Calif., www.spectratek.net/productlines/holographic/patterns/index.html). The reflective foil provides high visibility regardless of weather (in either sunlight or overcast conditions). If light is available the reflective foil is reflective.

Figure 3:
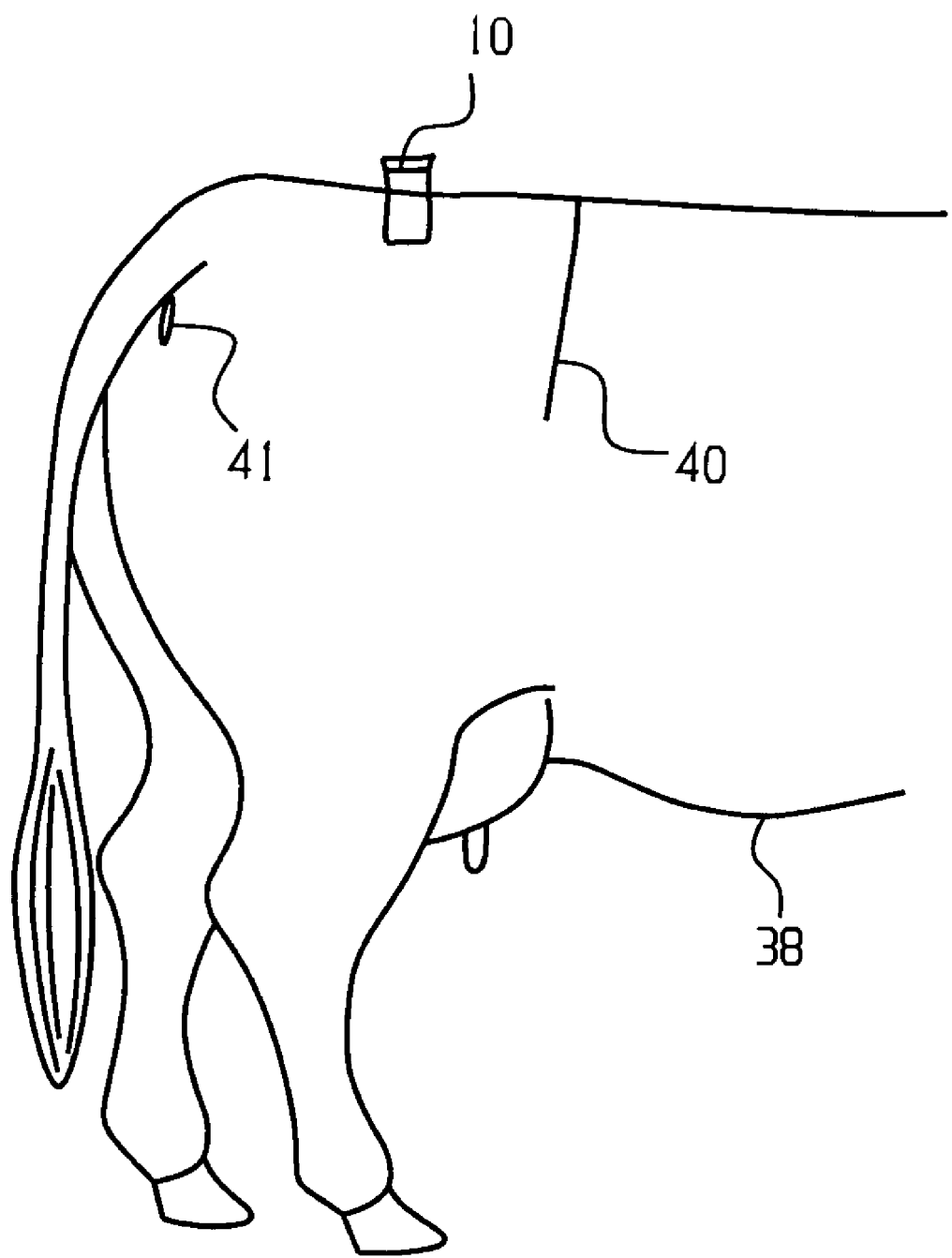
FIG. 3 is a perspective view of an embodiment of the invention in position on an animal.

The first adhesive layer 14 affixes the indicator layer 12 and, thus, the indicator apparatus 10 to the first animal. The composition of the adhesive used in the first adhesive layer 14 should provide sufficient fixation such that the apparatus will remain affixed to the first animal after mounting by a second animal. Desirably, the adhesive provides excellent initial tack and good adhesion to animal hair. The adhesive may be, for example, a rubber based adhesive such as TL-1000 manufactured by Wausau Coated Products. Providing the first adhesive layer 14 as precoated layer provides for simple application of the indicator 10 to the first animal. However, as desired, the indicator 10 may be affixed by a separate manual application of glue or other adhesives. When a precoated adhesive layer is used as the first adhesive layer 14, a removable liner 18 is preferably provided to protect the laminate adhesive from premature drying or inadvertent adherence to a non-selected surface. When it is desired to affix the apparatus to the first animal, the adhesive is exposed by removing the liner 18. The adhesive layer 14 is thus exposed and the indicator 10 can be affixed to the animal on the animal's back perpendicular to the spine halfway between the pin bones and the hook bones as shown in FIG. 3.

Optionally, a liner is provided over the top surface of the first adhesive layer.

Over the indicator layer 12 is a floodcoat 16 (or "mask adhesive") layer, removal of which exposes the indicator layer 12 to indicate that the animal has been mounted, thereby indicating that the animal is in heat or has been bred. In order for removal of the floodcoat layer 16 to expose the indicator layer 12, the floodcoat layer 16 is preferably an opaque layer that, when in place, totally obscures the indicator layer 12. In a preferred embodiment, the floodcoat layer 16 is a gray layer. The floodcoat 16 is preferably removable, such as an emulsion acrylic removable/repositionable adhesive. In this way, while the floodcoat 16 adheres to the indicator layer 12, it may also release from the indicator layer 10 without tearing the indicator layer 12 or removing the indicator apparatus 10 from the animal wearing it. Preferably, the floodcoat layer 16 is itself a "peel off" adhesive such that a further adhesive is not required to adhere the floodcoat layer 16 to the indicator layer 12. The adhesive floodcoat layer 16 should have good initial tack and moderate adhesion. Thus, for example, R-201 Blackout Adhesive manufactured by Wausau Coated Products may be used as the floodcoat layer. Alternately, the floodcoat 16 may be adhered to the indicator layer 12 by applying a separate adhesive to the bottom surface of the floodcoat layer or to the top surface of the indicator layer 12. Such adhesive, however, should be configured to release the floodcoat layer 16 from the indicator layer 12 upon application of a preselected amount of pressure to the indicator apparatus 10.

In one embodiment, in order to remove the floodcoat layer 16 and thus expose the indicator layer 12, a preselected pressure must be applied to the indicator apparatus 10. This pressure is the pressure required to obtain sufficient friction or adhesion of the floodcoat 16 to the top animal to thereby remove the floodcoat 16. The pressure required differs according to the intended breed or size of animals with which the indicator apparatus 10 is to be used and may vary from approximately 30 pounds force to approximately 300 or 400 pounds force.

A surface liner 20 is optionally provided along the adhesive surface of the floodcoat 16 to prevent soiling of the floodcoat layer 16 or adhesion of the floodcoat 16 to a non-selected surface. The surface liner 20 is preferably a peel off layer to be removed upon fixation of the indicator apparatus 10 on the first animal.

A further option is to configure the floodcoat 16 as a rubberized coating that adheres to the indicator layer 16 but is rubbed off by friction, for example the friction of the second animal mounting the first animal.

Figure 2:
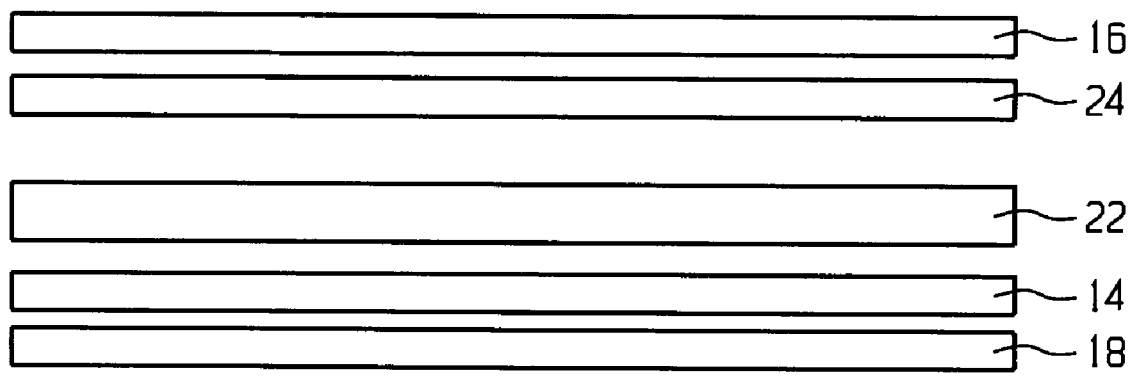
FIG. 2 is an exploded side view of a second embodiment of the invention.

FIG. 2 depicts an alternate embodiment of the invention wherein the indicator layer is a vinyl substrate or sheet 22. Preferably, the vinyl substrate or sheet 22 is manufactured of white flexible vinyl, which may alternatively be colored. If the vinyl substrate or sheet 22 is white, it is preferably inked or coated with a high-visibility pigment 24 that may be viewed from some distance and will not camouflage on any naturally-occurring color of the target animals. Alternatively, the coating may be a colored coating, tint, or stain.

A rubber-based permanent adhesive 18 suitable for adhesion to the animal's hide is preferably applied to the hide-adhering surface of the vinyl indicator layer.

2. Methods of Use

FIG. 3 illustrates an estrus/breeding indicator 10 according to one embodiment of the present invention deployed on a heifer 38. The apparatus 10 is affixed to the animal on the animal's back perpendicular to the spine halfway between the pin bones and the hook bones.

When female cattle, for example a dairy heifer or cow, wearing the apparatus comes into heat, the animals is likely to be mounted by other animals from the herd. When another animal mounts the animal wearing the apparatus, the floodcoat adheres to the front of the mounting animal, rubbing or pulling the floodcoat off of the indicator layer. Alternately, if the floodcoat is not adhesive on its outer surface (i.e., it adheres only to the indicator layer), the friction caused by the mounting animal may be expected to rub off the mask layer. The mounted animal is left wearing the indicator layer, which is visible from a distance, thus indicating that the animal is in heat. The animal may then be separated from the herd for insemination or mating.

Optimal beef or dairy cattle breeding program animals should be having normal estrus or heat cycles which range from 18 to 24 days. The age of puberty ranges from 10 to 16 months of age in virgin heifers. Beef and dairy animals are expected to calve the first time at approximately 24 months of age, therefore they must conceive by at least 15 months of age. The normal pregnancy rates from any single artificial insemination or natural service range from 40 to 60 percent. To maximize the number of animals conceiving in any one group the herdsman should plan a minimum of 2 to 3 breeding cycles over the 45 to 70 day time period.

Estrus detection prior to breeding can be difficult in groups of animals. The apparatus disclosed herein should be used as a breeding management tool to determine the percent of animals cycling prior to any attempted breeding. The apparatus is unique in that is shows the additive effect of multiple mounting which is the physical expression of estrus or heat. Other products available on the market are "one and done" type devices. The breeding events documented by the device of this application versus other existing products could be 6 to approximately 24 hours apart. When it is determined that a minimum of about 60% of virgin heifers are cycling the expected pregnancy rates will be higher. The apparatus disclosed in this application is an indicator of actual standing heats which is a more accurate determination of cyclicity and true estrus than a single mount. Research has shown that when three standing heat events are documented, pregnancy rates increase by 41%. M. B. G. Dransfield, R. L. Nebel, R. E. Peason and L. D. Warnick, *Timing of Insemination for Dairy Cows Identified in Estrus by a Radiotelemetric Estrus Detection System*, Journal of Dairy Science, Vol. 81, No. 7, 1998. The additive design of the apparatus allows for more accurate timing of breeding by any method and will document the number of mountings that occur with individual animals. Breeding time data may be used to accurately calculate expected time of birth.

The method can also be used to monitor anestrous, monitor pregnancy for unexpected termination of pregnancy, and to diagnose physical conditions such as cystic follicles or infectious reproductive disease including Vibriosis and Leptospirosis.

Referring to FIG. 4, in a basic aspect, the invention provides a method of determining breeding status in animals by (a) determining a breeding event (cyclicity, mounting, pregnancy, openess or the like), (b) providing a breeding event or status detection apparatus, (c) affixing the breeding event or status detection apparatus at a predetermined location on a female animal at a predetermined application time prior to the breeding event, and (d) monitoring the breeding event or status detection apparatus for activation thereof.

A. Cyclicity Determination

Cyclicity, in short, is the process of identifying initial cycles of heifers. Referring to FIG. 5, the detector apparatus described herein may be employed by various methods to manage the reproduction of dairy or other cattle or herds. In one embodiment of the method of the invention, the heat detector is secured to the rump of virgin beef and dairy heifers to determine cyclicity, or sexual puberty, in the animals prior to attempted breeding by natural or artificial service. Attach the detector 30 to 60 days prior to intended breeding period then count the number of activated patches and divide by the number of exposed animals to determine the percentage of animals cycling indicating sexual puberty. Device activation is preferably established by observing a minimum of 50% of the gray scratch-coat layer having been removed by mounting activity.

B. Natural Service

Referring to FIG. 6, in another embodiment of the method, the detector is secured to the rump of female beef and dairy animals bred by natural service to determine if the animals were bred by the bulls. Reapply a different color after the device is activated by natural breeding 1 to 2 weeks following breeding or activation of the earlier apparatus to determine conception/pregnancy from the previous breeding. Continue these steps with each of preferably four colors for additional breeding information such as open (failure to conceive) maintenance of pregnancy, miscarriage, abortion and various physiological and infectious conditions.

EXAMPLE

Natural Service Breeding Program

Figure 10:
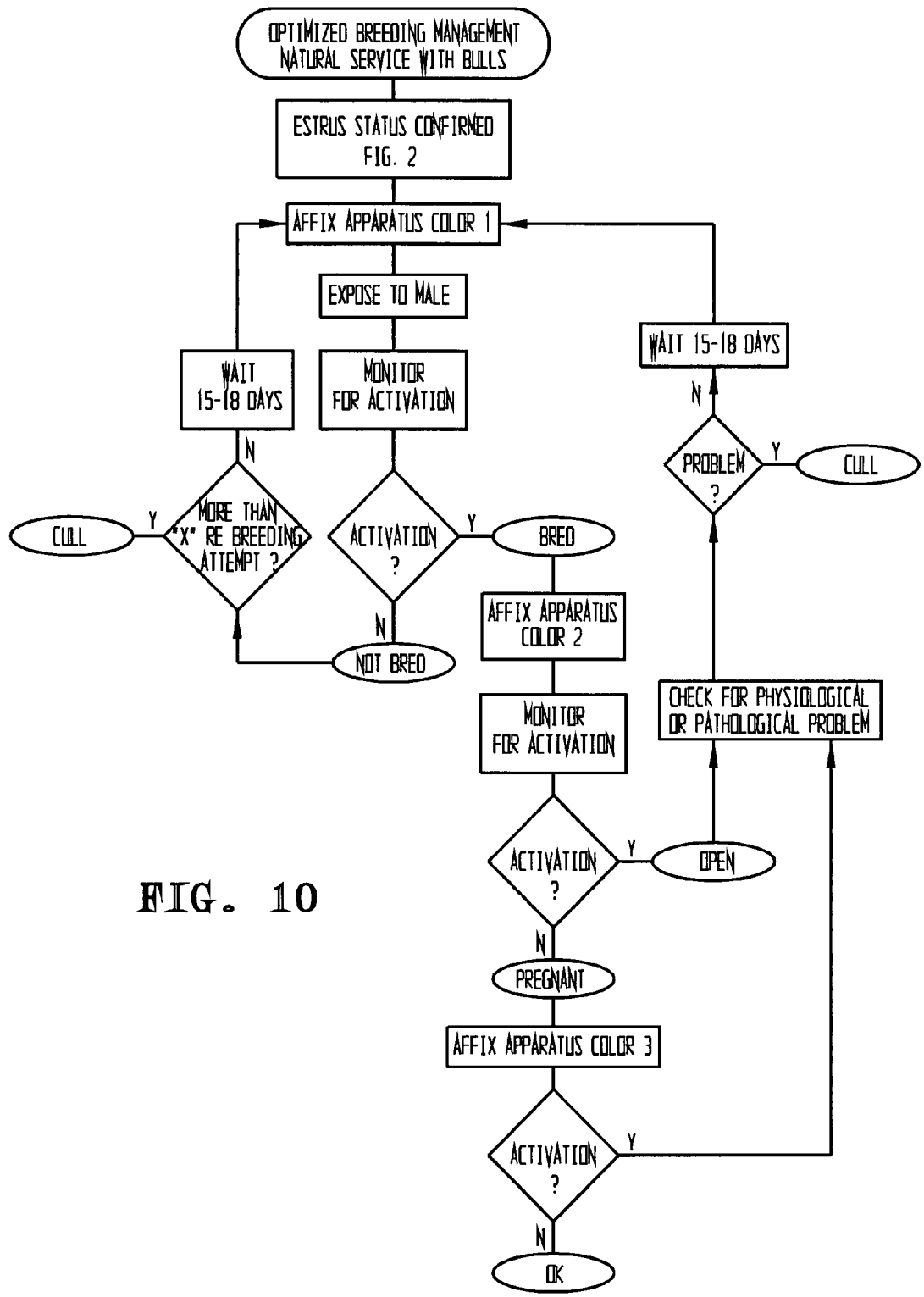
FIG. 10 is a flow diagram of another embodiment of the method for breeding via natural service.

Referring to FIG. 10:
1. Apply a first colored device, for example green, approximately 30 days prior to turn out of bulls to determine cyclicity for natural mating by bulls.
2. Reapply a second, different colored device, for example red/orange at bull turn out to determine cyclicity and natural mating by the bulls.
3. Reapply every 21 days if possible to observe for rebreeding or the lack thereof which may be indicative of pregnancy or failure thereof, maintenance of pregnancy or failure thereof, and various physiological or pathological conditions such as anestrous, Vibriosis, Leptospirosis or the like.
4. Apply the first colored device (in this example Green) again when bulls are removed from pastures to observe for animals that did not conceive for culling.

C. Embryo Transfer

Figure 8:
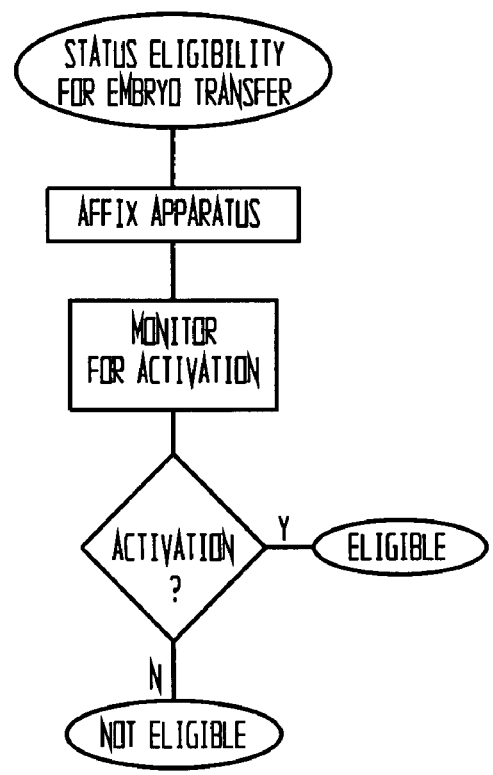
FIG. 8 is a flow diagram of an embodiment of the method wherein the breeding status is eligibility for embryo transfer.

The method may be applied to determine eligibility for embryo transfer. Referring to FIG. 8, the detector is secured to the rump of potential recipient animals to be used in embryo transfer programs to determine cyclicity and suitability for use as host animals for fertilized eggs from donor animals.

D. Synchronization

The detector device is secured to the rump of animals in estrus synchronization programs to determine the percentage of animals cycling as an indicator of breeding potential. Apply the detector at the beginning of the observation period following the last step in the synchronization program prior to actual breeding. The breeding can be by either artificial insemination or natural service. One to two weeks following breeding reapply another color detector to check for non-pregnant animals that demonstrate standing estrus or heat, and are ready for rebreeding or resynchronization.

EXAMPLE

Estrus Synchronization Programs with Heat Detection

Figure 9:
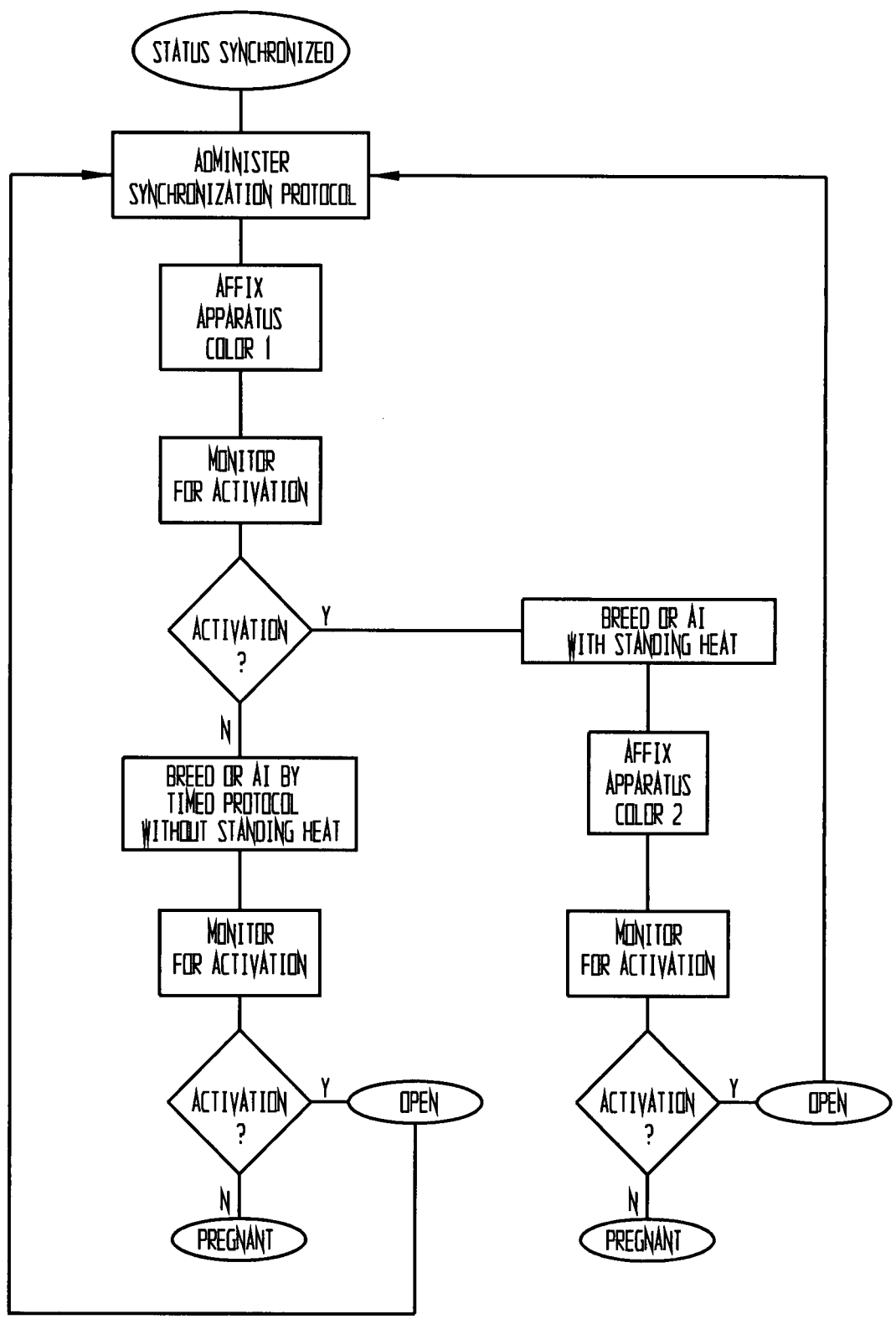
FIG. 9 is a flow diagram of an embodiment of the method for breeding, by natural service or artificial insemination, following estrus syncronization.

Referring to FIG. 9,
1. Apply a first colored device, preferably Green, 40 days post calving to determine cyclicity for early breeding.
    a. Breed on indication of standing estrus or after device activation. Device activation is preferably established by observing a minimum of 50% of the gray scratch-coat layer having been removed by mounting activity.
2. Reapply the Green colored device 10 days following breeding up to initiation of synchronization (approximately 70 days post calving) for observation of return to estrus.
    a. Breed 12 hours following indication of standing estrus or after device activation (i.e. a minimum of 50% of the gray scratch-coat layer have been removed by mounting activity).
3. Initiate an Estrus Synchronization Protocol.
    a. Apply a second, different colored device, preferably Blue, following last step in synchronization protocol to observe cyclicity and standing estrus.
    b. Breed 12 hours after indication of standing estrus or after device activation (minimum of 50% of the gray scratch-coat layer has been removed by mounting activity).
4. Repeat steps 2 and 3 using third and fourth colors, preferably Fuchsia and red/orange, until pregnancy is diagnosed or resynchronization occurs.

EXAMPLE

Estrus Synchronization Programs with Timed Artificial Insemination (AI)

1. Subsequent to appropriate pharmaceutical treatment for synchronization, apply a first (preferably Green) colored device 40 days post calving to determine cyclicity for early breeding.
    a. Breed 12 hours following indication of standing estrus or 12 hours following an activated device. (when a minimum of 50% of the gray scratch-coat layer have been removed by mounting activity).
2. Initiate a Timed Artificial Insemination (TAI) Estrus Synchronization protocol.
    a. Apply a second, (preferably Blue) colored device following last step in synchronization protocol to observe cyclicity and standing estrus.
    b. Breed 12 hours after indication of standing estrus or immediately after a minimum of 50% of the gray scratch-coat layer have been removed by mounting activity.
    c. Breed all animals that have not exhibited standing estrus or had activated device at TAI designated time.

E. Artificial Insemination

Figure 7:
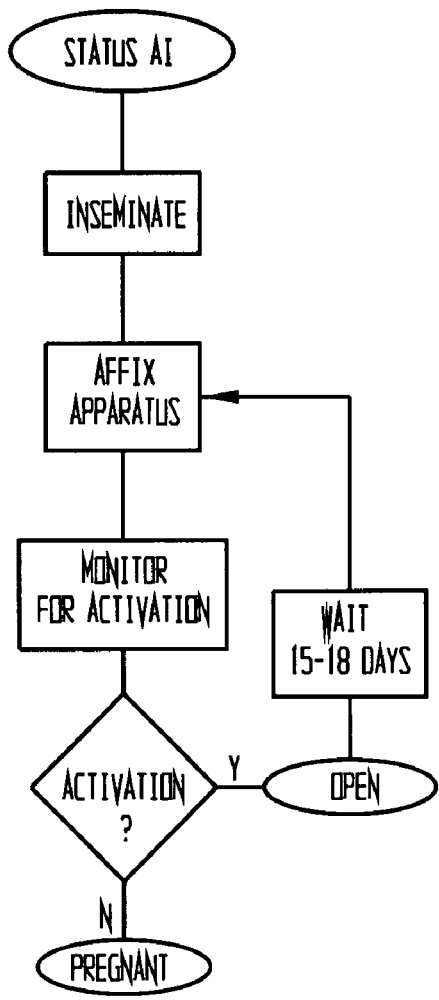
FIG. 7 is a flow diagram of an embodiment of the method wherein the breeding status is artificial insemination.

Referring to FIG. 7, the method may be utilized to optimize artificial insemination. Apply the series of colors to the rump of animals breed in artificial insemination breeding programs to determine the breeding status of animals by the color codes. For example, to determine cyclicity apply a first (for example, green) detector 40 days post calving. After breeding the cycling female, apply a second (for example, blue) detector 1 to 2 weeks following the first insemination to check for non-pregnant animals for rebreeding or resynchronization. Apply a third (for example, fuchsia) detector 1 to 2 weeks following the second breeding or insemination to determine non-pregnant animals for rebreeding or resynchronization. Apply a fourth (for example, red/orange) detector 1 to 2 weeks following the third breeding or insemination to determine non-pregnant animals for rebreeding or resynchronization. This rotation may be repeated if pregnancy has not occurred following the fourth breeding or insemination.

EXAMPLE

Normal Artificial Insemination Breeding Programs

1. Apply the first (green) colored device 40 days post calving to determine cyclicity for early breeding
    a. Breed 12 hours following indication of standing estrus or immediately following an activated device. (when a minimum of 50% of the gray scratch-coat layer have been removed by mounting activity).
2. Reapply a second (blue) colored device 10 days post first breeding to observe for return to estrus.
   a. Rebreed 12 hours following indication of standing heats or immediately following activated devices (50% of gray scratch-coat removed).
   b. If device is not activated by 45 days post breeding check for pregnancy.
3. Reapply a third (fuchsia) colored device 10 days after the second insemination post breeding to observe to return to estrus.
   a. Rebreed 12 hours following indication of standing heats or on activated device (50% of gray scratch-coat removed).
   b. If device is not activated by 45 days post breeding check for pregnancy.
4. Reapply a fourth (red/orange) colored device 10 days post breeding to observe to return to heat.
   a. Have animal checked by reproductive professional for diagnosis of possible physical or disease problems preventing conception or pregnancy.
   b. Rebreed 12 hours following indication of standing heats or immediately flowing an activated device (50% of gray scratch-coat removed).
   c. If device is not activated by 45 days post breeding check for pregnancy.
5. Repeat steps 1-4 if the animal is not diagnosed pregnant.

The apparatus and methods disclosed may be used alone or in combination with other apparatus and methods, including, but not limited to ear tags, RFID devices, ultrasound, and manual gynecological examination and manipulation.

This device embodiments disclosed herein is a comprehensive breeding management tool that may be useable to show the breeding status in other various breeding management programs not described herein.

Although the apparatus/method has been described in connection with the field of dairy cows or cattle, it can readily be appreciated that it is not limited solely to such field, and can be used in other fields including, but not limited to beef cattle, sheep, goats, deer, llamas, camels and alpaca.

The embodiments above are chosen, described and illustrated so that persons skilled in the art will be able to understand the invention and the manner and process of making and using it. The descriptions and the accompanying drawings should be interpreted in the illustrative and not the exhaustive or limited sense. The invention is not intended to be limited to the exact forms disclosed. While the application attempts to disclose all of the embodiments of the invention that are reasonably foreseeable, there may be unforeseeable insubstantial modifications that remain as equivalents. It should be understood by persons skilled in the art that there may be other embodiments than those disclosed which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

What is claimed is:

1. A method of determining breeding status in animals comprising the steps of:
   (a) monitoring cyclicity and natural service breeding in animals;
   (b) providing a first breeding detection apparatus, wherein the first breeding detection apparatus shows a predetermined first color upon progressive exposure of an indicator being indicative of a first breeding event, cyclicity, and activation of the first breeding detection apparatus;
   (c) affixing the first breeding detection apparatus at a predetermined location on a female animal;
   (d) monitoring the first breeding detection apparatus for progressive exposure of the indicator and activation thereof;
   (e) removing the activated breeding detection apparatus from the female animal after progressive exposure of the indicator indicates a first breeding event of the first breeding apparatus;
   (f) affixing a second breeding detection apparatus to the female animal, which upon progressive exposure of the indicator shows a second color, indicating a second breeding event and activation thereof;
   (g) exposing the female animal to a male animal for a predetermined period of time;
   (h) monitoring the female animal with the second breeding detection apparatus for a predetermined period of time, the activation of which by exposure of the indicator showing a second color, indicative of the second breeding event, natural service breeding by the male animal; and
   (i) further comprising the step of repeating steps (a)-(h) on each individual female animal in a herd of animals including a plurality of female individual animals.

2. The method of claim 1, wherein animals are selected from the group of animals consisting of dairy cattle, beef cattle, sheep, goats, llamas, camels, deer, water buffalo, oxen, alpaca or other ruminants or cloven hooved animals.

3. The method of claim 1, wherein the breeding detection apparatus comprises a first adhesive layer configured for affixing contact with the female animal; an indicator layer; and a floodcoat layer removably affixed to the indicator layer and adapted for removal by the male animal upon mounting of the female animal by the male animal, the floodcoat layer being removably affixed to the indicator layer by peel off or friction to yield activation.

4. The method of claim 3, wherein activation is at least approximately 50% removal of the floodcoat layer.

5. The method of claim 1, wherein the predetermined location on the animal is the rump of the female animal.

6. The method of claim 1, further comprising the step of determining an expected breeding event time, and wherein the first breeding detection apparatus is affixed a first predetermined time period, and wherein the first predetermined time period is approximately 30-60 days prior to the breeding event time.

7. A method of determining breeding status in animals comprising the steps of:
   (a) monitoring two breeding events consisting of cyclicity and natural service breeding, and at respective breeding event times;
   (b) providing a breeding detection apparatus, the breeding detection apparatus comprising:
      (i) a first adhesive layer configured for affixing contact with a female animal;
      (ii) an indicator layer; and
      (iii) a floodcoat layer removably affixed to the indicator layer and adapted for progressive removal by a male animal upon mounting of the female animal by the male animal, the floodcoat layer being removably affixed to the indicator layer by peel off or friction to yield activation, wherein the breeding detection apparatus shows a predetermined first color upon progressive exposure of the indicator and activation indicative of a first breeding event, cyclicity;
(c) affixing the breeding detection apparatus at a predetermined location on the female animal at predetermined application time before the breeding event time;
(d) monitoring the breeding detection apparatus for progressive exposure of the indicator layer and activation thereof;
(e) removing the activated breeding detection apparatus from the female animal upon activation thereof;
(f) affixing a second breeding detection apparatus to the female animal, which upon activation has a second color;
(g) exposing the female animal to the male animal for a predetermined period of time;
(h) monitoring the animal with the second breeding detection apparatus for the predetermined period of time, the progressive exposure of the indicator layer and activation of which is indicative of a second breeding event, natural service breeding by the male animal; and
(i) further comprising the step of repeating steps (a)-(h) on each individual female animal in a herd of animals including a plurality of female individual animals.

* * * * *